UNITED STATES PATENT OFFICE.

EDWARD WRAY, OF BIEBRICH-ON-THE-RHINE, AND FRITZ HESS, OF WIESBADEN, GERMANY, ASSIGNORS TO THE FIRM OF KALLE AND COMPANY, AKTIENGESELLSCHAFT, OF BIEBRICH-ON-THE-RHINE, GERMANY.

MANUFACTURE OF VAT DYESTUFFS.

1,144,577.   Specification of Letters Patent.   Patented June 29, 1915.

No Drawing.   Application filed October 29, 1913.   Serial No. 798,197.

*To all whom it may concern:*

Be it known that we, EDWARD WRAY, a subject of the King of England, residing at Biebrich-on-the-Rhine, Germany, and FRITZ HESS, a subject of the Swiss Republic, residing at Wiesbaden, Germany, have invented certain new and useful Improvements in the Manufacture of Vat Dyestuffs, of which the following is a specification.

In the specification of German Letters Patent Number 207097 it has been shown that indigoid vat dyestuffs can be obtained by condensing the reactive isatin-alpha derivatives with substituted phenols containing a free ortho-position.

Now, we have found that valuable vat dyestuffs differing from the known coloring matters by dyeing a much darker blue to violet-black or deep black shades, may be obtained, if instead of the phenols used in the process of German Patent 207097, other derivatives or amino naphthols are employed which contain an amino group substituted in a suitable manner, *e. g.*, by an acidyl or aminocarbonyl radical or residue, or in which the imino group forms a part of a closed nucleus, as for instance that of the naphthimidazole ring.

In lieu of the derivatives of amino-oxy-naphthalenes above mentioned their substitution products, homologues and analogues may be employed in the same manner as well as the substitution products, homologues and analogues of the isatin-alpha derivatives.

The novel products of the present invention when made from isatin-alpha-anilid, for example, and derivatives of 2-amino-5-naphthol in which the amino group is substituted by a carbonyl-containing residue, have a constitution represented graphically by the following formula:

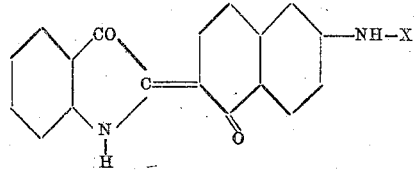

where X is a carbonyl-containing residue.

Example 1: 2.6 parts of 2-benzoylamino-5-oxynaphthalene and 2.2 parts of isatin-alpha-anilid are boiled together with 25 parts of acetic anhydrid until the formation of the coloring matter is complete. After cooling the dyestuff obtained is filtered, washed with alcohol and dried. It dyes textile fibers from the vat fast bluish-black shades. It has a constitution represented graphically by the following formula:

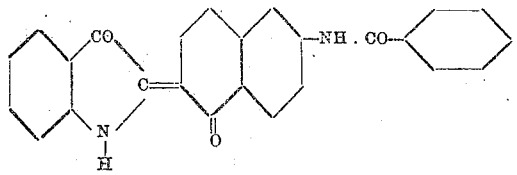

If in the foregoing example 1.7 parts of 5.5'-dioxy-2.2'-dinaphthyl-urea are employed instead of the 2.6 parts of 2-benzoylamino-5-oxynaphthalene, a bluish-black vat dyestuff is also obtained.

Example 2: 6 parts of 5-chlorisatin-2.-para-chloranilid and 4.6 parts of 5-oxy-1-phenyl-naphthylamin are heated with 30 parts of acetic anhydrid until the formation of the coloring matter is complete. After cooling the mass is filtered and washed with alcohol. The dyestuff obtained is in a dry state a dark blue powder soluble in concentrated sulfuric acid with a clear blue color. When treated with alkaline reducing agents it forms a yellow vat from which wool is dyed brownish-black shades.

Instead of the 5-oxy-1-phenyl-naphthylamin equivalent quantities of 5-oxy-1-anthraquinonyl-naphthylamin may be employed or equivalent parts of anthraquinonyl-1.2-triazole-5-oxynaphthalene (obtained from diazotized alpha-amino-anthraquinone, coupling with 2-amino-naphthalene, oxidizing to the triazole compound and fusion with alkali).

Example 3: 5.2 parts of 5-oxy-µ-phenyl-1.2-naphthimidazole and 4.5 parts of isatin-alpha-anilid are heated together with 25 parts of acetic anhydrid until the condensation is finished. After cooling the dyestuff is filtered, washed with acetic acid and alcohol and dried. The resulting coloring matter forms a bronze-like black powder soluble in sulfuric acid with a dark blue color. When treated with reducing agents the dyestuff forms a yellow vat from which wool is dyed fast black shades.

We claim:

1. Process for producing dark blue to violet to black dyestuffs which consists in condensing isatin alpha derivatives with derivatives of amino-naphthols.

2. Process for producing dark blue to violet to black dyestuffs which consists in condensing isatin-alpha derivatives with derivatives of amino-naphthols in which the amino group is substituted by an acidyl group.

3. Process for producing dark blue to violet to black dyestuffs which consists in condensing the isatin-alpha derivatives with derivatives of amino-naphthols in which the amino group is substituted by a carbonyl-containing residue.

4. As new products the vat dyestuffs being condensation products of isatin-alpha-derivatives with derivatives of amino-naphthols, forming in a dry state dark blue to violet to black powders being transformed by alkaline reducing agents into their leuco compounds from which the coloring matters are regenerated on treatment with oxidizing agents.

5. As new products the vat dyestuffs being condensation products of isatin-alpha derivatives with derivatives of amino- naphthols in which the amino group is substituted by a carbonyl-containing residue, forming in a dry state dark blue to violet to black powders being transformed by alkaline reducing agents into their leuco compounds from which the coloring matters are regenerated on treatment with oxidizing agents.

6. As new products the vat dyestuffs being condensation products of isatin-alpha derivatives with derivatives of amino-naphthols in which the amino group is substituted by an acidyl-containing residue, forming in a dry state dark blue to violet to black powders being transformed by alkaline reducing agents into their leuco compounds from which the coloring matters are regenerated on treatment with oxidizing agents.

7. As new products the vat dyestuffs of the following formula:

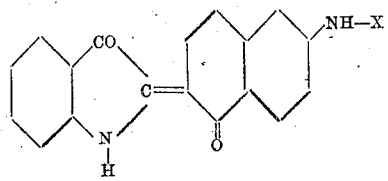

where X is a carbonyl-containing residue, obtainable by condensing isatin-alpha-anilid with derivatives of 2-amino-5-naphthol in which the amino group is substituted by a carbonyl-containing residue, forming in a dry state dark blue to black powders, being transformed by alkaline reducing agents into their leuco compounds from which the coloring matters are regenerated on treatment with oxidizing agents.

8. As a new product the vat dyestuff of the following formula:

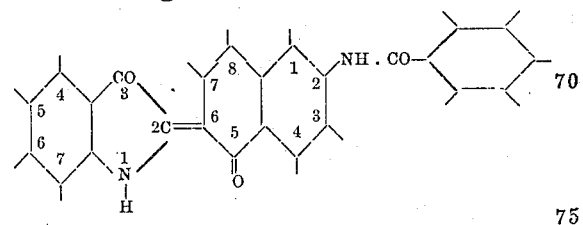

obtainable by condensing isatin-alpha-anilid with 2-benzoylamino-5-oxynaphthalene, forming a dark blue powder, giving on treatment with alkaline reducing agents a yellow vat from which textile fibers are dyed fast bluish-black shades.

In testimony whereof we have signed our names to this specification in the presence of two subscribing witnesses.

EDWARD WRAY.
DR. FRITZ HESS.

Witnesses:
MORITZ WETZEL,
MARIA HAHN.